United States Patent
Sim et al.

(10) Patent No.: US 9,014,259 B2
(45) Date of Patent: Apr. 21, 2015

(54) APPARATUS AND METHOD FOR SEQUENTIALLY PARSING BITSTREAMS BASED ON REMOVAL OF EMULATION PREVENTION BYTE

(75) Inventors: Donggyu Sim, Seoul (KR); Doo Hyun Kim, Seoul (KR); Joon Ho Song, Gyeonggi-do (KR); Shi Hwa Lee, Seoul (KR); Do Hyung Kim, Gyeonggi-do (KR); Hyun Ho Cho, Seoul (KR); Jin Sub Lee, Seoul (KR); Jeong Han Seo, Seoul (KR)

(73) Assignees: Samsung Electronics Co., Ltd., Suwon-Si (KR); Kwangwoon University Industry-Academic Collaboration Foundation, Seoul (KR)

(*) Notice: Subject to any disclaimer, the term of this patent is extended or adjusted under 35 U.S.C. 154(b) by 408 days.

(21) Appl. No.: 13/331,713

(22) Filed: Dec. 20, 2011

(65) Prior Publication Data
US 2012/0155551 A1 Jun. 21, 2012

(30) Foreign Application Priority Data
Dec. 21, 2010 (KR) .................. 10-2010-0131791

(51) Int. Cl.
H04N 7/26 (2006.01)
H04N 19/42 (2014.01)
H04N 19/44 (2014.01)
G06F 9/30 (2006.01)
H04N 19/70 (2014.01)

(52) U.S. Cl.
CPC .................. *H04N 19/42* (2014.11); *G06F 9/30* (2013.01); *H04N 19/70* (2014.11); *H04N 19/44* (2014.11)

(58) Field of Classification Search
CPC .................. H04N 19/00478; H04N 19/00533; H04N 7/26; G06F 9/30
USPC .................. 375/240, 240.02, 240.25, 240.26, 375/E7.027, E7.09, E7.129; 382/232, 233, 382/238; 712/220, E09.016
See application file for complete search history.

(56) References Cited

U.S. PATENT DOCUMENTS

2002/0072893 A1* 6/2002 Wilson .......................... 703/26
2005/0007263 A1 1/2005 Zhou
(Continued)

FOREIGN PATENT DOCUMENTS

KR 10-0841338 6/2008

OTHER PUBLICATIONS

European Office Action for corresponding European Application 11194929.3-1247; dated Jul. 5, 2012.
(Continued)

*Primary Examiner* — Jorge L Ortiz Criado
*Assistant Examiner* — Albert Kir
(74) *Attorney, Agent, or Firm* — Staas & Halsey LLP

(57) ABSTRACT

An apparatus and method sequentially parses bitstreams based on a removal of an Emulation Prevention Byte (EPB). The apparatus and method may detect an EPB pattern from among sequentially input bitstreams, may store the bitstreams, may store a processed bitstream where the EPB pattern is removed, among the bitstreams, and may select an output of a register buffer based on an input of a buffer selection flag.

14 Claims, 8 Drawing Sheets

(56) References Cited

U.S. PATENT DOCUMENTS

2008/0130735 A1    6/2008   Meric
2008/0209180 A1*   8/2008   Lee ............................. 712/220
2009/0228601 A1*   9/2009   Tseng et al. ................. 709/231
2009/0257667 A1   10/2009   Naito
2011/0280314 A1*  11/2011   Sankaran et al. ........ 375/240.25

OTHER PUBLICATIONS

Final Report on research and development result entitled "Development of a Multi-Audio SoC supporting DAB for Reception" published Dec. 30, 2005; for Business for Upgrading the Information and Communication Industry Competence; 1-224 pages.

* cited by examiner

APPARATUS AND METHOD FOR SEQUENTIALLY PARSING BITSTREAMS BASED ON REMOVAL OF EMULATION PREVENTION BYTE

CROSS-REFERENCE TO RELATED APPLICATIONS

This application claims the benefit of Korean Patent Application No. 10-2010-0131791, filed on Dec. 21, 2010, in the Korean Intellectual Property Office, the disclosure of which is incorporated herein by reference.

BACKGROUND

1. Field

Example embodiments of the following description relate to a hardware apparatus that may parse bitstreams at high speed and that may be used for instruction of a processor in a design of an audio/video decoder, and more particularly, to an apparatus and method for sequentially parsing bitstreams based on a removal of an Emulation Prevention Byte (EPB).

2. Description of the Related Art

Recently, a large amount of research has been conducted to replace a conventional hardware design through the development of processors suitable for a predetermined purpose.

To decode bitstreams of audio and video at high speed, it is inevitable to implement (1) a function corresponding to an instruction GetBits to read bitstreams corresponding to a requested length and to shift a position of bitstreams, (2) a function corresponding to an instruction ShowBits to read bitstreams corresponding to a requested length and not to shift the position of bitstreams, and (3) a function corresponding to an instruction SkipBits to shift only the position of the bitstreams. The above three functions may be commonly used to parse bitstreams, regardless of a type of audio codec and a type of video codec.

An H.264/Advanced Video Codec (AVC) that is the most widely used among video codecs may use a start code "0x00000001" to identify a Network Abstraction Layer (NAL). A decoding system of the H.264/AVC may first verify the start code of the NAL, may determine a single NAL unit in bitstreams, and may decode the bitstreams in the NAL.

However, during encoding of the bitstreams, a same pattern as the start code may occur in an intermediate portion of the NAL. In the H.264/AVC, an Emulation Prevention Byte (EPB) "0x03" may be additionally inserted into the bitstreams, thereby preventing the same pattern as the start code from occurring in the intermediate portion of the NAL. Accordingly, the decoding system of the H.264/AVC needs to remove the EPB existing in a single NAL, prior to decoding of the NAL.

In a system for sequentially reading bitstreams and decoding the read bitstreams, to remove an EPB first, an NAL may be read, and an EPB code may be searched for while sequentially parsing the bitstreams. Subsequently, the found EPB code may be removed, and the bitstreams may be decoded again from a starting point of the NAL. Here, since the bitstreams need to be loaded in a memory while overlapping one another, a performance of the system may be reduced.

SUMMARY

The foregoing and/or other aspects are achieved by providing an apparatus for sequentially parsing bitstreams for decoding, including an Emulation Prevention Byte (EPB) processor to detect an EPB pattern from among bitstreams that are sequentially input, a first register buffer unit to store the bitstreams, a second register buffer unit to store a processed bitstream where the EPB pattern is removed among the bitstreams, and an output buffer selection unit to select an output of at least of the first register buffer unit and the second register buffer unit, based on an input of a buffer selection flag.

The foregoing and/or other aspects are achieved by providing a method of sequentially parsing bitstreams, including detecting an EPB pattern from among bitstreams that are sequentially input, storing the bitstreams, storing a processed bitstream where the EPB pattern is removed among the bitstreams, and selecting an output of at least one of the bitstreams and the processed bitstream, based on an input of a buffer selection flag.

The forgoing and/or other aspects are achieved by providing a method of sequentially parsing bitstreams, including detecting a predetermined pattern from among bit streams which are sequentially input, storing the bitstreams, storing a processed bitstream where the predetermined pattern is removed, and selecting one of the bitstreams and the processed bitstream based on a status of a selection flag.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
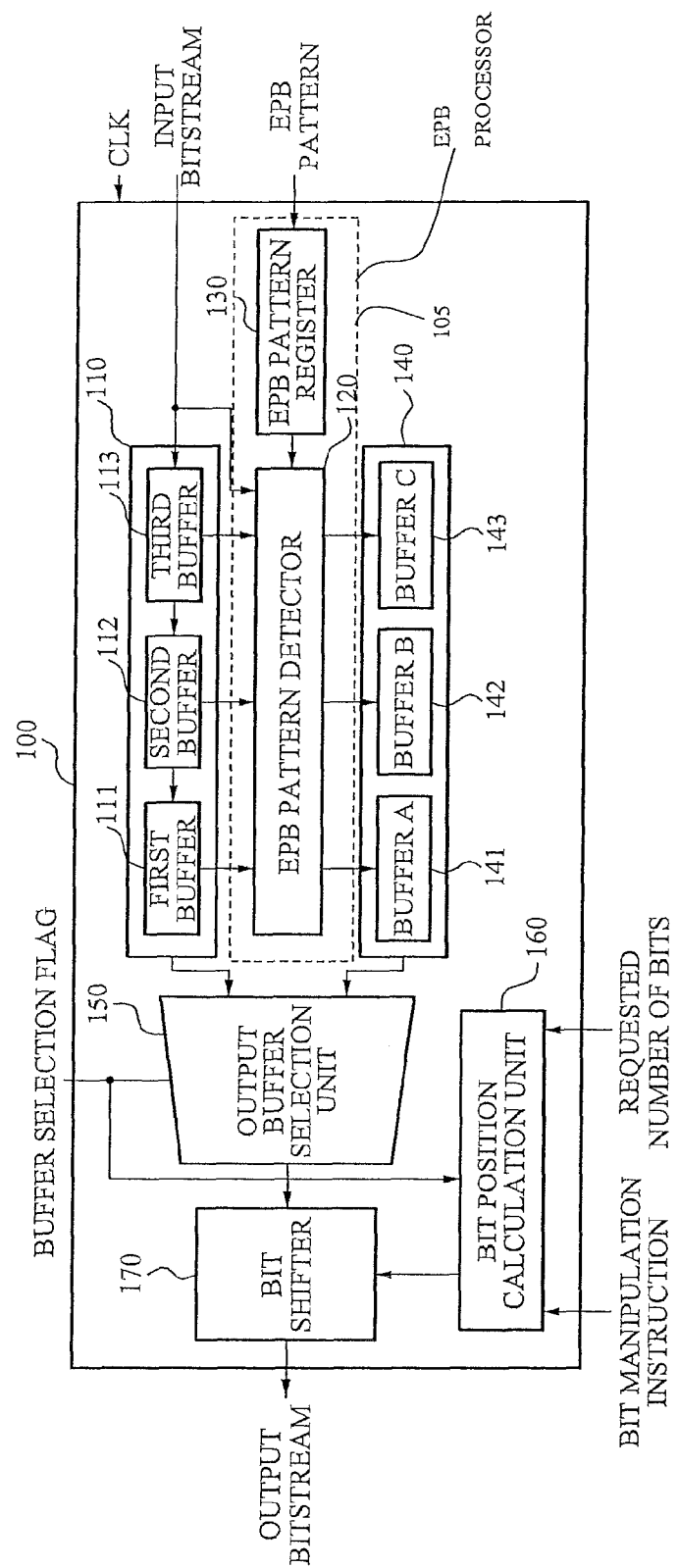
FIG. 1 is a block diagram of a bitstream parsing apparatus for sequentially parsing bitstreams for decoding according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 is a block diagram of a bitstream parsing apparatus 100 for sequentially parsing bitstreams for decoding according to example embodiments. The bitstream parsing apparatus 100 may refer to a high-speed parsing apparatus having functions corresponding to bit manipulation instructions GetBits, ShowBits, and SkipBits that are required to parse compressed audio bitstreams and compressed video bitstreams at high speed. The bitstream parsing apparatus 100 may provide a function of sequentially decoding bitstreams.

Referring to FIG. 1, the bitstream parsing apparatus 100 may include an Emulation Prevention Byte (EPB) processor 105, a first register buffer unit 110, a second register buffer unit 140, and an output buffer selection unit 150. The EPB processor 105 may verify an EPB pattern among bitstreams, and may remove the verified EPB pattern, so that a processed bitstream may be generated. Here, the bitstreams may be sequentially input. Accordingly, the EPB processor 105 may include an EPB pattern detector 120, and an EPB pattern register 130.

The EPB pattern register 130 may verify an EPB pattern to be detected in a predetermined register, in response to an input instruction. The EPB pattern detector 120 may remove the verified EPB pattern from the bitstreams, to generate the processed bitstream.

The bitstream parsing apparatus 100 may include buffers used to store bitstreams from which the EPB pattern is removed, and buffers used to store bitstreams where the EPB pattern is not removed, so that an EPB code may be removed while the bitstreams are read all at once. Accordingly, the bitstream parsing apparatus 100 may include the first register buffer unit 110 and the second register buffer unit 140.

The first register buffer unit 110 may store the bitstreams. Specifically, the first register buffer unit 110 may store bitstreams including an EPB pattern. The first register buffer unit 110 may include a first buffer 111, a second buffer 112, and a third buffer 113, in order to store, in an internal register, input bitstreams stored in a Random Access Memory (RAM) or a Dynamic Random Access Memory (DRAM).

Each of the first buffer 111, the second buffer 112, and the third buffer 113 may include a register having 32 bits. The bitstreams may be sequentially stored in the first buffer 111, the second buffer 112, and the third buffer 113. For example, when a bitstream "0xAAAAAAAABBBBBBBBCCCCCCCC" is sequentially loaded, "0xAAAAAAAA", "0xBBBBBBBB", and "0xCCCCCCCC" may be respectively stored in the first buffer 111, the second buffer 112, and the third buffer 113.

When an initialization instruction is input, the first register buffer unit 110 may be filled with the bitstreams including the EPB pattern.

The second register buffer unit 140 may store a processed bitstream where the EPB pattern is removed, among the bitstreams. Specifically, the second register buffer unit 140 may store the processed bitstream, using a buffer A 141, a buffer B 142, and a buffer C 143 that are included in the second register buffer unit 140. Each of the buffer A 141, the buffer B 142, and the buffer C 143 may include a register having 32 bits.

The EPB pattern detector 120 may receive the lower 16 bits of the first buffer 111, 32 bits of the second buffer 112, 32 bits of the third buffer 113, and a 32-bit input. The EPB pattern detector 120 may determine whether the bistreams include the EPB pattern verified by the EPB pattern register 130.

Accordingly, the EPB pattern detector 120 may store, in the second register buffer unit 140, bitstreams where the EPB pattern is removed from the bitstreams.

The output buffer selection unit 150 may select an output of at least one register buffer between the first register buffer unit 110 and the second register buffer unit 140, based on an input of a buffer selection flag.

The bitstream parsing apparatus 100 may further include a bit position calculation unit 160, and a bit shifter 170, as shown in FIG. 1. The bit shifter 170 may receive the output selected by the output buffer selection unit 150, and may perform a shift operation. The bit position calculation unit 160 may receive a bit manipulation instruction, and a requested number of bits, may adjust a bit position of a bitstream stored in advance, and may output an original bit position of the bitstream to the bit shifter 170.

In other words, the output buffer selection unit 150 may transfer, to the bit shifter 170, an output of either the first register buffer unit 110 including the EPB pattern or the second register buffer unit 140 without including the EPB pattern, based on an input value for the buffer selection flag.

The bit position calculation unit 160 may selectively output, to the bit shifter 170, a bit offset stored in the first buffer 111 and a bit offset stored in the buffer A 141, based on the input of the buffer selection flag. Additionally, the bit position calculation unit 160 may shift an output bit from a position of the current bit by the requested number of bits, only when GetBits and SkipBits are input among the bit manipulation instructions GetBits, ShowBits, and SkipBits.

The bit shifter 170 may output a value of 32 bits, based on bit position information received from the bit position calculation unit 160 and based on a bitstream received from the output buffer selection unit 150, and may support a decoding operation to be quickly and accurately processed.

Thus, according to example embodiments, to minimize a load of bitstreams in a memory, a decoding operation may be supported through a scheme of sequentially loading the memory only once. Additionally, in the scheme of sequentially loading the memory, it is also possible to provide hardware that is used only to parse bitstreams and that has a function of effectively removing an EPB code.

Figure 2:
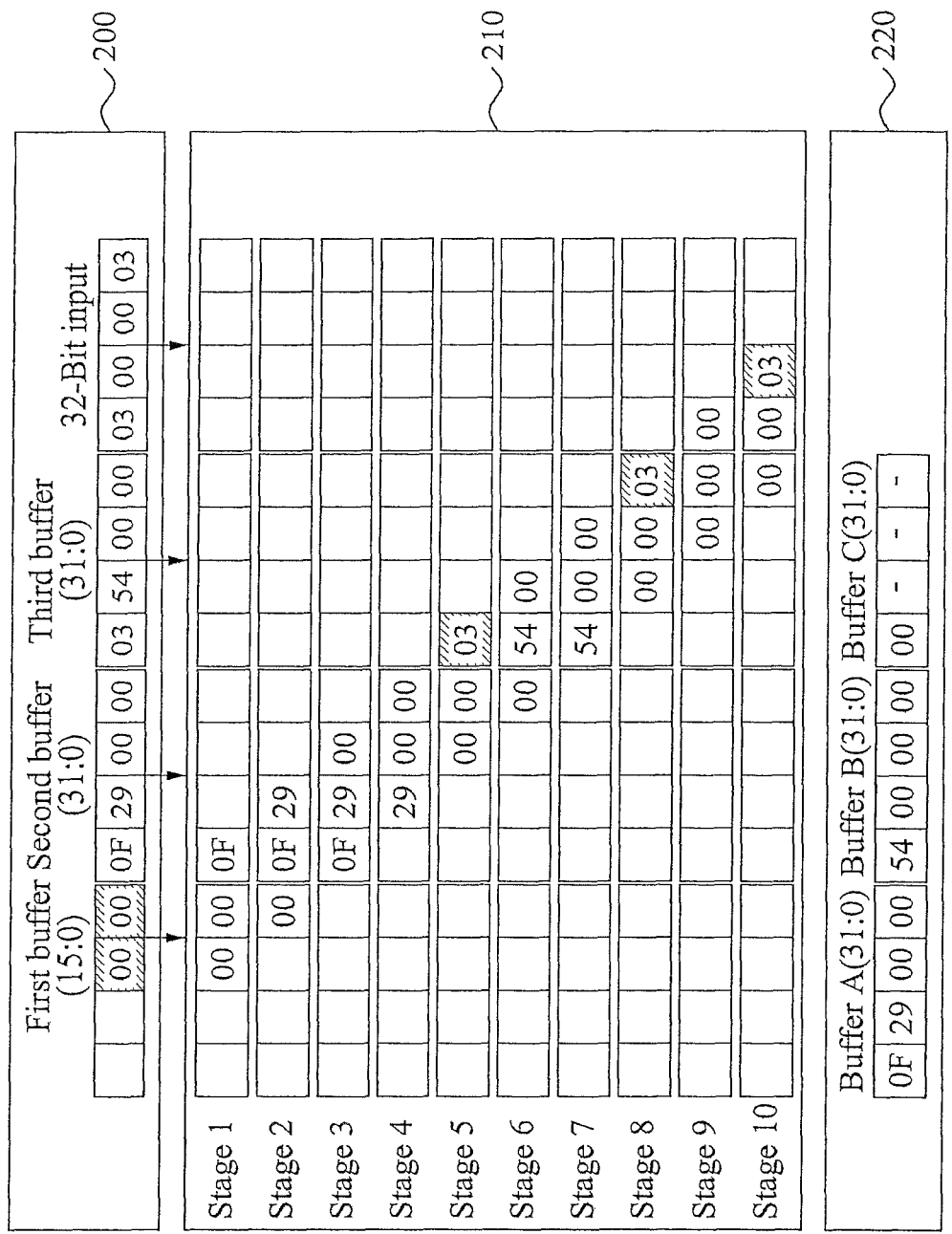
FIGS. 2 and 3 are diagrams of examples of an operation of an Emulation Prevention Byte (EPB) pattern detector of FIG. 1.
Figure 3:
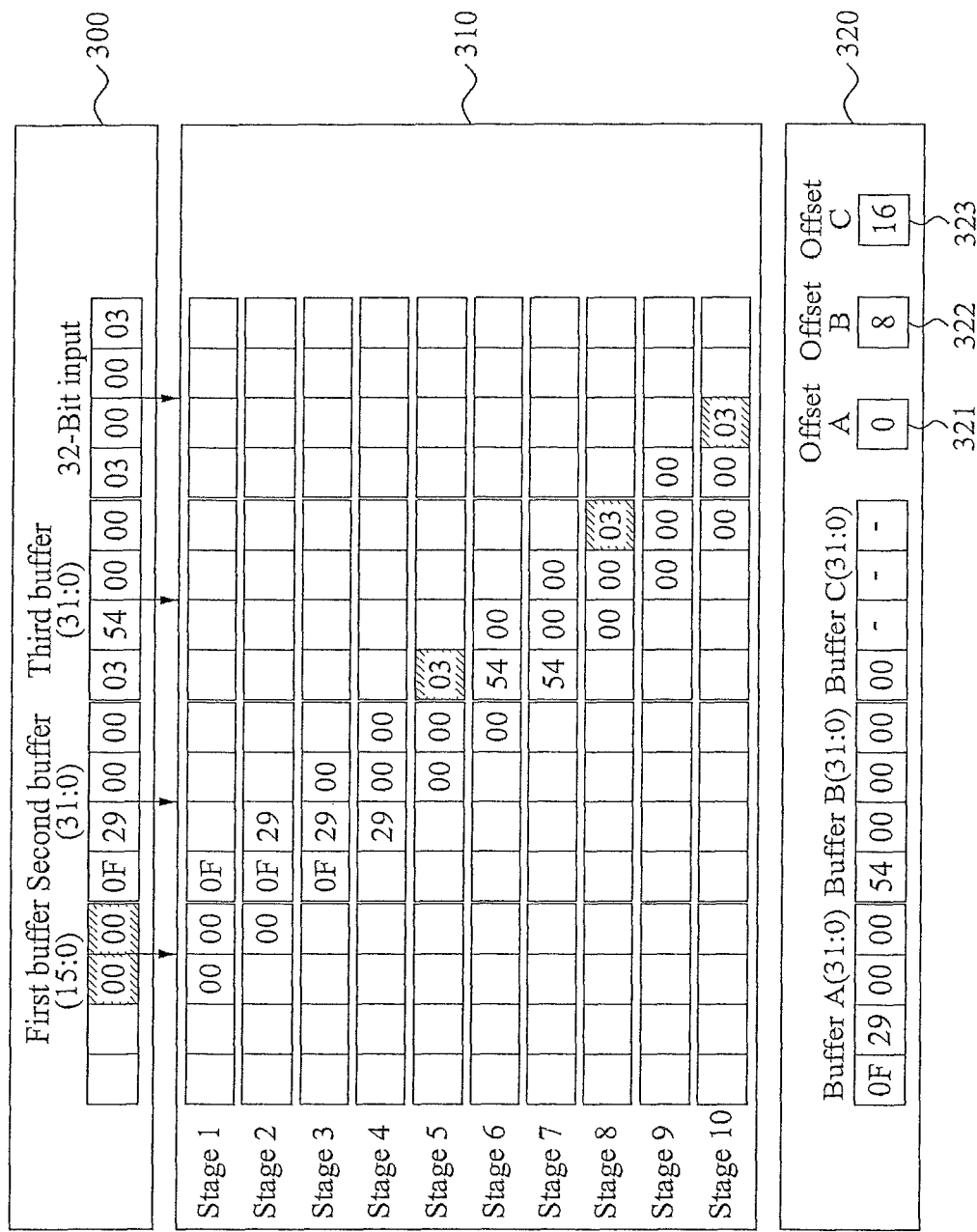

FIGS. 2 and 3 illustrate examples of an operation of the EPB pattern detector 120 of FIG. 1. Specifically, FIG. 2 illustrates an example of the operation of the EPB pattern detector 120, and an example of storing a result of the operation in the second register buffer unit 140 that does not include the EPB pattern.

In FIG. 2, an EPB pattern may continue in the second buffer 112 and the third buffer 113. The EPB pattern detector 120 may be operated by the bit position calculation unit 160 of FIG. 1, when updated position information of the bufferA 141 is equal to or greater than "32". Referring to reference numeral 200 in FIG. 2, values of the first buffer 111, the second buffer 112, and the third buffer 113 may be input to the EPB pattern detector 120, prior to being transmitted. A position where the EPB pattern is actually detected may correspond to the second buffer 112, the third buffer 113, and the register of the 32-bit input. However, to detect an EPB pattern continuing in the first buffer 111 and the second buffer 112, the value of the first buffer 111 may be used as a reference.

Referring to reference numeral 210 in FIG. 2, a value of 3 bytes may be compared with a value stored in the EPB pattern register 130 of FIG. 1, during detection of the EPB pattern.

Referring to reference numeral 220 in FIG. 2, when the detection of the EPB pattern is completed, a bitstream from which an EPB pattern value of "0x03" is removed may be stored in the second register buffer unit 140 of FIG. 1. Here, after the EPB pattern value is removed, consecutive bitstreams may be stored without maintaining a corresponding space, as shown in FIG. 2.

Referring to FIG. 3, the EPB pattern detector 120 may be operated by the bit position calculation unit 160 of FIG. 1, when updated position information of the bufferA 141 is equal to or greater than "32". Referring to reference numeral 300 in FIG. 3, input bitstreams may be transferred to the first buffer 111, the second buffer 112, and the third buffer 113, and at the same time, may be input to the EPB pattern detector 120. A position where the EPB pattern is actually detected may correspond to the second buffer 112, the third buffer 113, and the register of the 32-bit input. However, to detect an EPB pattern continuing in the first buffer 111 and the second buffer 112, the value of the first buffer 111 may be used as a reference.

Referring to reference numeral 310 in FIG. 3, a value of 3 bytes may be compared with a value stored in the EPB pattern register 130 of FIG. 1, during detection of the EPB pattern. When an operation represented by reference numeral 310 is completed, a bitstream from which an EPB pattern value of "0x03" is removed may be stored in the second register buffer unit 140. Here, bitstreams from which an EPB pattern is removed may be aligned in Least Significant Bit (LSB) positions of the bufferA 141, the buffer B 142, and the buffer C 143, and may be stored, as shown in FIG. 3.

Specifically, bitstreams from which an EPB pattern is removed in the second buffer 112 may be aligned and stored from the LSB position of the buffer A 141, and bitstreams from which an EPB pattern is removed in the third buffer 113 may be aligned and stored from the LSB position of the buffer B 142. Additionally, bitstreams from which an EPB pattern is removed in the 32-bit input may be aligned and stored from the LSB position of the buffer C 143. For example, in the third buffer 113, a bit "0x03" continuing in the second buffer 112 and the third buffer 113 may be removed. Other bits "0x54", "0x00", "0x00" may be stored in the LSB position of the buffer B 142.

Referring to reference numeral 320 in FIG. 3, an offset A 321, an offset B 322, and an offset C 323 may be used to store actual bit position information, and may exist with respect to each of the bufferA 141, the buffer B 142, and the buffer C 143.

When a single EPB pattern is detected from the buffer B 142 as shown in FIG. 3, bitstreams from which the EPB pattern is removed may be stored from the LSB position of the buffer B 142. Additionally, an offset of an actually significant bit may correspond to "8" and accordingly, a value of "8" may be stored in the offset B 322. The offset A 321 and the offset C 323 may respectively store a position of a significant bit in the bufferA 141, and a position of a significant bit in the buffer C 143.

Figure 4:
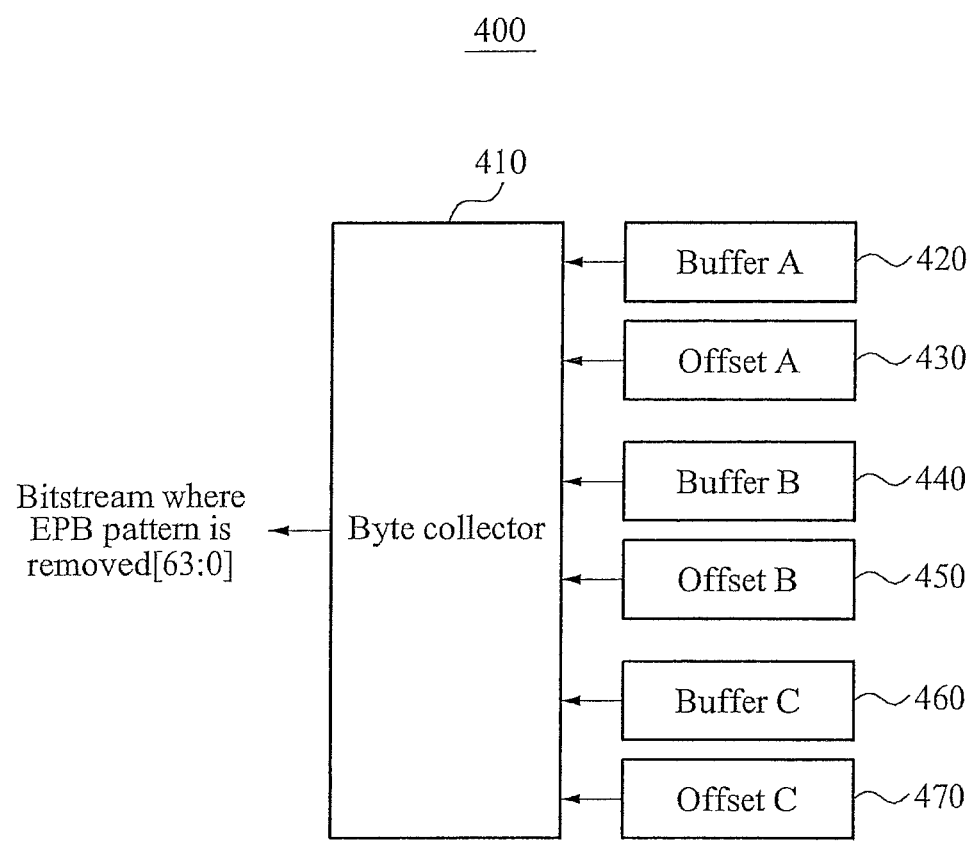
FIG. 4 is a diagram of an apparatus including a byte collector for an example of FIG. 3.

FIG. 4 illustrates a diagram of an apparatus 400 including a byte collector 410 for the example of FIG. 3. The byte collector 410 of FIG. 4 may collect significant bits from a bufferA 420, a buffer B 440, and a buffer C 460, and may generate an input value of the output buffer selection unit 150 of FIG. 1, when an output value of the EPB pattern detector 120 is stored as shown in FIG. 3.

Referring to the example of FIG. 3, the buffer A 420, the buffer B 440, and the buffer C 460 may include bitstreams from which an EPB pattern is removed, and accordingly at least three buffers need to be used to generate a return value in response to a request of 32 bits as a maximum limit. Specifically, the byte collector 410 may receive the bitstreams stored in the bufferA 420, the buffer B 440, and the buffer C 460, and an offset A 430 for the buffer A 420, an offset B 450 for the buffer B 440, and an offset C 470 for the buffer C 460, and may form a 64-bit bitstream for an input of the output buffer selection unit 150 of FIG. 1.

Figure 5:
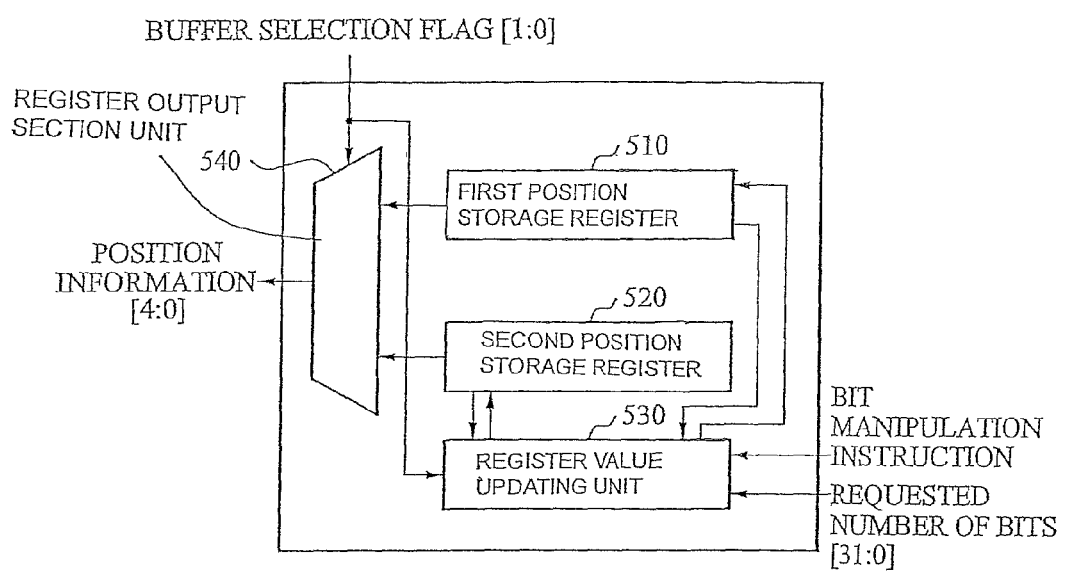
FIG. 5 is a diagram of a bit position calculation unit according to example embodiments.

FIG. 5 illustrates a diagram of a bit position calculation unit 500 according to example embodiments. Referring to FIG. 5, the bit position calculation unit 500 corresponds to the bit position calculation unit 160 of FIG. 1 and may include a first position storage register 510, a second position storage register 520, a register value updating unit 530, and a register output selection unit 540.

The first position storage register 510 may store a position of a bit to be parsed in a first buffer 111 of a first register buffer unit 110 including an EPB pattern. The second position storage register 520 may store a position of a bit to be parsed in a buffer A 141 among a set of bitstream buffers that do not include an EPB pattern. The register value updating unit 530 may receive, as inputs, a call for a single instruction among GetBits, ShowBits, and SkipBits, a number of bits requested in response to the call, a buffer selection flag, a value of the first position storage register 510, and a value of the second position storage register 520. The register value updating unit 530 may update either the value of the first position storage register 510, or the value of the second position storage register 520, based on a value of the buffer selection flag.

The register output selection unit 540 may selectively output current offset information of a buffer stored in either the first position storage register 510, or the second position storage register 520 for the bit shifter 170 of FIG. 1.

Figure 6:
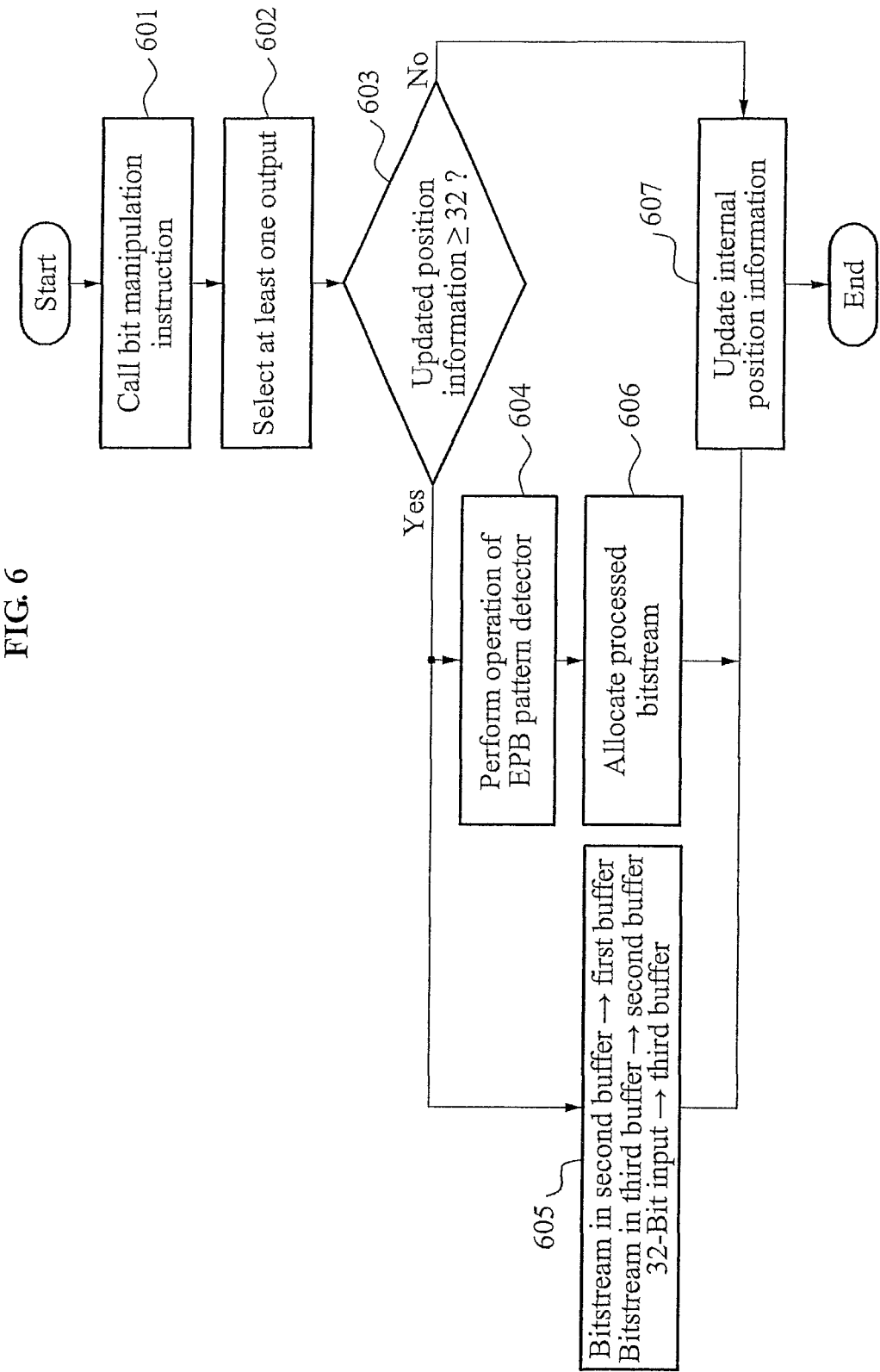
FIG. 6 is a flowchart of a method of sequentially parsing bitstreams for decoding according to example embodiments.

FIG. 6 is a flowchart of a method of sequentially parsing bitstreams for decoding according to example embodiments. The method of FIG. 6 may be performed when initial bitstreams are loaded in a register buffer set (e.g., buffers 111, 112 and 113) including an EPB pattern, and in a register buffer set (e.g., buffers 141, 142 and 143) that does not include an EPB pattern, in response to an initialization instruction. Accordingly, the method of FIG. 6 may be used to detect an EPB pattern from sequentially input bitstreams, to store the bitstreams, and to store a processed bitstream where the EPB pattern is removed among the bitstreams.

In operation 601, one of bit manipulation instructions GetBits, ShowBits, and SkipBits may be called, so that the method of FIG. 6 may be started. Here, a buffer selection flag, and a requested number of bits may be simultaneously received as hardware inputs.

In operation 602, an output of at least one of the bitstreams and the processed bitstream may be selected using the output buffer selection unit 150 and the bit shifter 170.

When the bit manipulation instruction is called, the output buffer selection unit 150 may select one of the two register buffer sets from the first and second register buffer units 110 and 140. Additionally, the bit shifter 170 may output an output value of 32 bits based on position information of the bit position calculation unit 160.

In operation 603, position information of a bit to be decoded in the buffer A 141 may be updated, and whether the updated position information is equal to or greater than "32" may be determined, through the bit position calculation unit 160. When it is determined that the updated position information is less than "32", an input of a new bitstream may not be performed, and the bit position calculation unit 160 may be operated to update internal position information in operation 607.

When it is determined that the updated position information is equal to or greater than "32", an EPB pattern detector 120 may be operated to control the lower 16 bits of the first buffer 111, a second bit, a third bit, and a 32-bit input to be applied to the EPB pattern detector 120 in operation 604. In the method of FIG. 6, an EPB pattern to be detected may be verified in a predetermined register in response to an input instruction, and the verified EPB pattern may be removed from the bitstreams, so that the processed bitstream may be generated.

The EPB pattern detector 120 may remove the EPB pattern from the second buffer 112, the third buffer 113, and the 32-bit input, based on the lower 16 bits of the first buffer 111, and may store a processed bitstream where the EPB pattern is removed, in buffer A 141, a buffer B 142, and buffer C 143 in operation 606.

During operation 604, a bitstream stored in the second buffer 112 may be transferred to the first buffer 111, a bitstream stored in the third buffer 113 may be transferred to the second buffer 112, and the 32-bit input may be newly stored in the third buffer in operation 605.

Additionally, the bit position calculation unit 160 may be operated to update internal position information in operation 607, even when the updated position information is equal to or greater than "32".

Figure 7:
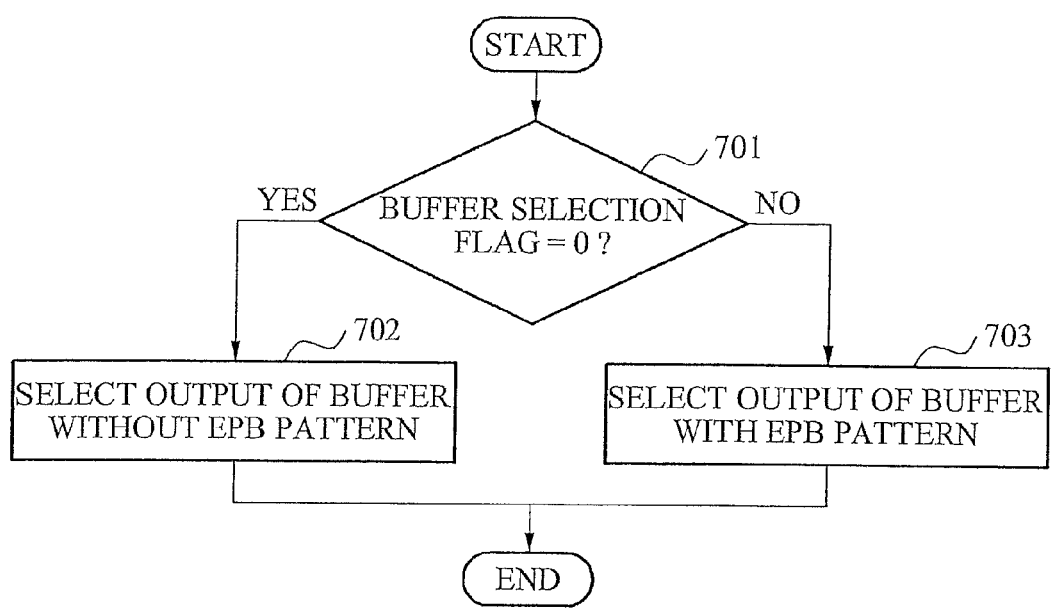
FIG. 7 is a flowchart of an operation of an output buffer selection unit of FIG. 1.

FIG. 7 is a flowchart of an operation of the output buffer selection unit 150 of FIG. 1.

Referring to FIG. 7, in operation 701, whether an input buffer selection flag has a value of "0" may be determined. When it is determined that the buffer selection flag has the value of "0", an output of a buffer without an EPB pattern, that is, an output of the second register buffer unit 140 of FIG. 1 may be selected in operation 702. When it is determined that the buffer selection flag has a value other than "0", an output of a buffer with an EPB pattern, that is, an output of the first register buffer unit 110 of FIG. 1 may be selected in operation 703.

The method of FIG. 6 may be used to perform a shift operation on bitstreams that are selected and output, and to support decoding. Here, a bit manipulation instruction, and a requested number of bits may be received, a bit position of a bitstream stored in advance may be adjusted, and an original bit position of the bitstream may be reflected on the shift operation. Such a double bufferstream structure may be used to parse bitstreams in the register buffer set including the EPB pattern to compare start codes and the like, even when the EPB pattern is removed during sequential decoding of bitstreams, so that a problem occurring in the sequential decoding may be solved.

Figure 8:
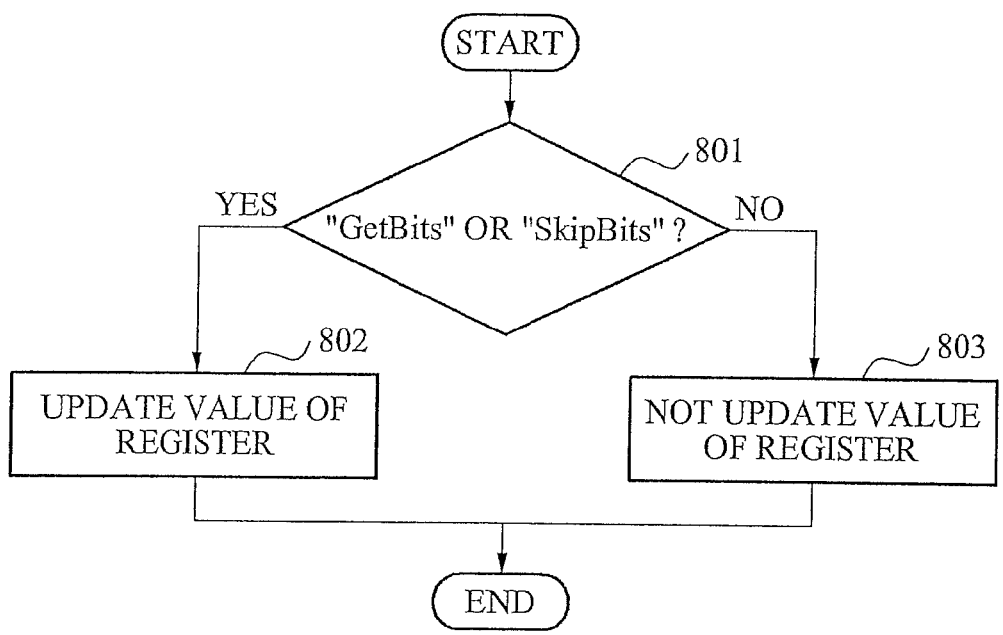
FIG. 8 is a flowchart of a scheme of updating a position storage register value according to example embodiments.

FIG. 8 illustrates a flowchart of a scheme of updating a position storage register value according to example embodiments. Referring to FIG. 8, in operation 801, whether an input bit manipulation instruction is GetBits or SkipBits may be determined. When either a bit manipulation instruction GetBits or SkipBits is input, either the first position storage register 510 of FIG. 5 or the second position storage register 520 of FIG. 5 may be selected, a requested number of bits may be added to a value of a corresponding position storage register, so that the value of the register may be updated.

Here, a position storage register may have a maximum value of "31". In other words, when the position storage register has a value equal to or greater than "32", the value of the position storage register may be started again from "0". For example, when a value of a position storage register is updated to "32", the value of the position storage register may be changed to "0". Additionally, when a value of a position storage register is updated to "33", the value of the position storage register may be changed to "1". Furthermore, when a value of a position storage register is updated to "34", the value of the position storage register may be changed to "2".

When neither GetBits nor SkipBits is input, that is, when a bit manipulation instruction ShowBits is input, the value of the register may not be updated in operation 803. Here, a requested value of bits may not be reflected on updating of the value of the register that is stored in advance.

According to an example embodiment, a video codec, such as an H.264/Advanced Video Codec (AVC), may use an EPB code. To remove the EPB code, a problem of loading bitstreams while overlapping one another may be solved in a decoder.

Additionally, according to an example embodiment, a double buffer structure including both a bitstream buffer, and a bitstream buffer from which an EPB is removed may be used and accordingly, it is possible to solve a conventional problem even when bitstreams are sequentially parsed.

Furthermore, according to an example embodiment, functions corresponding to GetBits, ShowBits, and SkipBits may exist and accordingly, it is possible to parse bitstreams at high speed in a single video codec or a single audio codec, and also possible to decode bitstreams at high speed in multiple video codecs or multiple audio codecs.

Moreover, according to example embodiment, an EPB removal pattern may be stored in an internal register through an instruction and accordingly, a High Efficiency Video Coding (HEVC) currently being standardized, or codecs to be developed after the HEVC may be compatible with each other without a change in hardware design.

The methods of sequentially parsing bitstreams for decoding according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), RAM, flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus for sequentially parsing bitstreams for decoding, the apparatus comprising:
   at least one processor;
   an Emulation Prevention Byte (EPB) processor to detect an EPB pattern from among bitstreams which are sequentially input;
   a first register buffer to store the bitstreams in a first buffer set comprising a plurality of buffers connected in series;
   a second register buffer to store a processed bitstream where the EPB pattern is removed, among the bitstreams, in a second buffer set comprising a plurality of buffers; and
   an output buffer selection to receive an input of a buffer selection flag having a first input value indicating selection of an output of the first register buffer, and to receive an input of a buffer selection flag having a second input value indicating selection of an output of the second register buffer
   wherein the EPB processor detects the EPB pattern based on the bitstreams stored in the first register buffer, removes the detected EPB pattern from the bitstreams to obtain the processed bitstream where the EPB pattern is removed, and stores the processed bitstream where the EPB is removed in the second register buffer, and the output buffer selection uses the at least one processor to implement the selection of the output of the first register buffer and to implement the selection of the output of the second register buffer.

2. The apparatus of claim 1, wherein the EPB processor comprises:
   an EPB pattern register to verify an EPB pattern to be detected in a predetermined register, in response to an instruction; and
   an EPB pattern detector to remove the verified EPB pattern from the bitstreams, and to generate the processed bitstream.

3. The apparatus of claim 1, further comprising a bit shifter to receive the selected output, and to perform a shift operation,
   wherein the bit shifter uses the at least one processor to implement the shift operation.

4. The apparatus of claim 3, further comprising a bit position calculation to receive a bit manipulation instruction and a requested number of bits, to adjust a bit position of a bitstream stored in advance, and to output an original bit position to the bit shifter,
   wherein the bit position calculation uses the at least one processor to implement the adjusting of the bit position of the bitstream stored in advance.

5. The apparatus of claim 4, wherein the bit position calculation unit selectively outputs, to the bit shifter, a bit offset stored in at least one of the first register buffer and the second register buffer, in response to an input of the buffer selection flag.

6. The apparatus of claim 4, wherein the bit manipulation instruction comprises at least one of GetBits, ShowBits, and SkipBits.

7. The apparatus of claim 4, wherein the bit shifter outputs a value of 32 bits using the bit position, and a bitstream received from the output buffer selection .

8. The apparatus of claim 1, wherein the bitstreams comprise at least one of audio bitstreams and video bitstreams.

9. A method of sequentially parsing bitstreams, comprising:
   detecting, using a processor, an Emulation Prevention Byte (EPB) pattern from among bitstreams which are bitstreams being sequentially input;
   storing the bitstreams in a first buffer set comprising a plurality of buffers connected in series;
   storing a processed bitstream where the EPB pattern is removed, among the bitstreams, in a second buffer set comprising a plurality of buffers;
   receiving an input of a buffer selection flag having a first input value indicating selection of an output of the bitstreams stored in the first buffer set; and
   receiving an input of a buffer selection flag having a second input value indicating selection of an output of the processed bitstream stored in the second buffer set,
   wherein the detecting further comprises detecting, using the processor, the EPB pattern based on the bitstreams stored in the first register buffer set and removing the detected EPB pattern from the bitstreams to obtain the processed bitstream where the EPB pattern is removed, and the processed bitstream where the EPB is removed is stored in the second register buffer set.

10. The method of claim 9, wherein the detecting further comprises:
    verifying an EPB pattern to be detected in a predetermined register, in response to an instruction; and
    removing the verified EPB pattern from the bitstreams, and generating the processed bitstream.

11. The method of claim 9, further comprising receiving the selected output from among the output of the bitstreams stored in the first buffer set and the output of the processed bitstream stored in the second buffer set, and performing a shift operation.

12. The method of claim 11, further comprising receiving a bit manipulation instruction and a requested number of bits, adjusting a bit position of a bitstream stored in advance, and reflecting an original bit position on the shift operation.

13. A non-transitory computer readable recording medium storing one or more programs to cause a computer to implement the method of claim 9.

14. A method of sequentially parsing bitstreams, comprising:
    detecting, using a processor, a predetermined pattern comprising an Emulation Prevention Byte (EPB) pattern from among bitstreams which are sequentially input;
    storing the bitstreams in a first buffer set comprising a plurality of buffers connected in series;
    storing a processed bitstream where the predetermined pattern is removed in a second buffer set comprising a plurality of buffers;
    receiving an input of a buffer selection flag having a first status indicating selection of an output of the bitstreams stored in the first buffer set;
    receiving an input of a buffer selection flag having a second status indicating selection of an output of the processed bitstream stored in the second buffer set; and
    outputting one of the bitstreams stored in the first buffer set and the processed bitstream stored in the second buffer set, according to a status of the buffer selection flag,
    wherein the detecting of the predetermined pattern further comprises detecting, using the processor, the predetermined pattern based on the bitstreams stored in the first buffer set and removing the detected predetermined pattern from the bitstreams to obtain the processed bitstream where the predetermined pattern is removed, and the processed bitstream where the predetermined pattern is removed is stored in the second buffer set.

* * * * *

UNITED STATES PATENT AND TRADEMARK OFFICE
CERTIFICATE OF CORRECTION

PATENT NO. : 9,014,259 B2  Page 1 of 1
APPLICATION NO. : 13/331713
DATED : April 21, 2015
INVENTOR(S) : Donggyu Sim et al.

It is certified that error appears in the above-identified patent and that said Letters Patent is hereby corrected as shown below:

In the claims,

Claim 1, Column 8, Line 56:

After "selection" insert --unit--.

Claim 1, Column 9, Line 1:

After "selection" insert --unit--.

Claim 4, Column 9, Line 19:

After "calculation" insert --unit--.

Claim 4, Column 9, Line 23:

After "calculation" insert --unit--.

Claim 7, Column 9, Line 36:

Delete "selection." and insert --selection unit.--, therefor.

Signed and Sealed this
Twenty-first Day of July, 2015

Michelle K. Lee
*Director of the United States Patent and Trademark Office*